United States Patent

Arbogast

[15] 3,648,438
[45] Mar. 14, 1972

[54] LIQUID PURIFICATION AND AERATION SYSTEM

[72] Inventor: Alva G. Arbogast, P. O. Box 1193, Charleston, W. Va. 25324

[22] Filed: Feb. 9, 1971

[21] Appl. No.: 113,917

[52] U.S. Cl. ..............................55/191, 55/196, 261/98, 261/152
[51] Int. Cl. ..........................................B01d 19/00
[58] Field of Search ......................55/40–44, 53, 57, 55/191, 192, 196, 204; 210/151, 180, 188; 261/69, 74, 94, 95, 98, 152

[56] References Cited

UNITED STATES PATENTS

| 2,308,866 | 1/1943 | Dekema | 210/151 X |
| 2,834,466 | 5/1958 | Hament | 55/196 X |
| 3,028,150 | 4/1962 | King | 55/196 X |
| 3,200,568 | 8/1965 | McNeil | 55/191 |
| 3,488,925 | 1/1970 | Arbogast | 55/192 |
| 3,565,767 | 2/1971 | Light | 203/011 |

Primary Examiner—Reuben Friedman
Assistant Examiner—R. W. Burks
Attorney—Robert G. McMorrow

[57] ABSTRACT

A liquid purification and aeration system including a condenser coil for preheating supply liquid, an external steam heater for superheating the liquid, a centrifugal nozzle for injecting the superheated liquid into a flash chamber surrounding the coil, a baffled overflow tube within the coil for maintaining a predetermined water level, a particulate aeration bed beneath the flash chamber for dispersing the sterile water overflow, and a filtered blower for forcing clean air up through the bed to aerate the fresh sterile water. The superheating pasteurizes the supply liquid to destroy bacterial impurities, the flashing removes and vents entrapped gaseous contaminants, and the aeration further purifies the liquid and oxidizes any remaining impurities.

8 Claims, 2 Drawing Figures

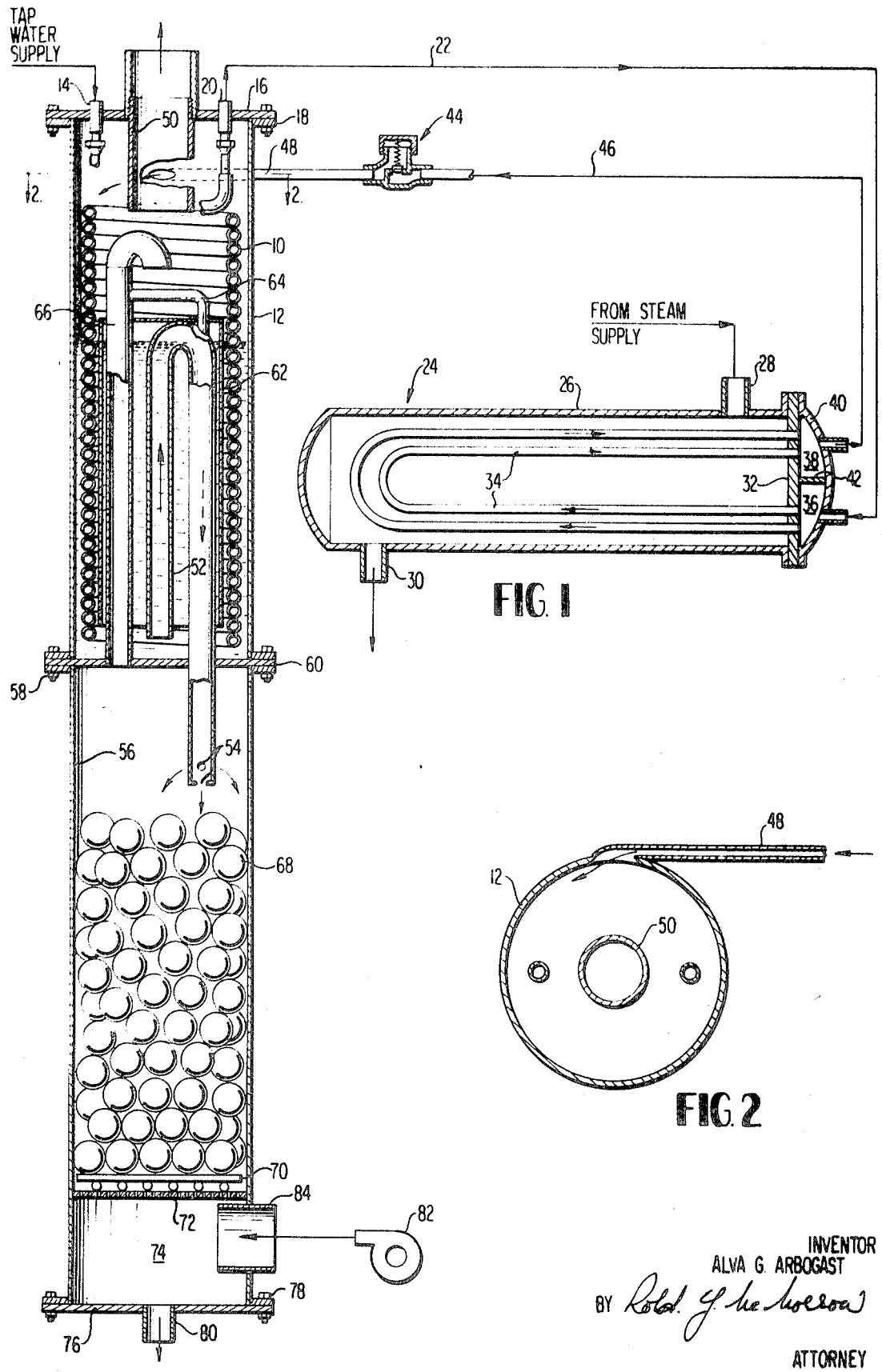

3,648,438

LIQUID PURIFICATION AND AERATION SYSTEM

BACKGROUND OF THE INVENTION

1. Field of the Invention

This invention relates in general to a liquid purification and aeration system, and more particularly to a compact and synergistic apparatus for purifying and aerating water for subsequent human consumption or for employment in industrial processes.

2. Description of the Prior Art

Applicant's U.S. Pat. No. 3,488,925, dated Jan. 13, 1970 for a Liquid Degasifying System, discloses a preheating supply water condenser coil disposed within a flash chamber into which superheated water is injected. While entirely suitable for some applications, the structural arrangement therein does not achieve the maximum heat exchange within the flash chamber that is essential in other applications where optimum economy and efficiency are required. In addition, no provision is made for aerating the pasteurized and degasified water, which is particularly effective to restore the fresh taste of potable water where human consumption is the intended end use.

SUMMARY OF THE INVENTION

This invention effectively overcomes the disadvantages and drawbacks inherent in the prior art system described above by providing a novel combination liquid purification and aeration system which is extremely compact in size and which achieves greatly increased efficiency through a unique and synergistic structural arrangement whereby the various functions performed by the apparatus enhance and reinforce each other.

In a preferred embodiment, incoming tap water is preheated in a helical condenser coil vertically disposed within a cylindrical flash chamber. The preheated water is then superheated in an external steam heater to destroy bacterial impurities and injected into the flash chamber through a tangentially oriented nozzle. When the pressurized, superheated water enters the flash chamber at atmospheric pressure, it immediately flashes, dispelling and releasing any entrapped gaseous contaminants. The flash steam then condenses on the coil, at the same time preheating the incoming tap water, and runs off to the bottom of the flash chamber. The fresh degassed sterile water rises in the chamber until it reaches the top of an overflow pipe mounted within the coil but separated therefrom by a cylindrical baffle. The overflowing degassed and pasteurized water is then dispersed over a gravel bed in a cylindrical aeration chamber aligned with and below the flash chamber. Air is blown up through the bed to aerate the sterile water and restore the taste of potable water thereto, and the exhaust air is vented to the atmosphere through the flash chamber, purging the latter of gases released by the flashing water.

The advantages and economies afforded by the unique structural arrangement employed include the following:

a. The flash steam and saturated water gives up its heat of vaporization and part of its latent heat of water to the incoming tap water in the condenser coil, thereby effecting a preheating action which reduces the amount of heat subsequently required to superheat the water;

b. The preheating is further implemented by the baffle separating the overflow pipe from the condenser coil, which forces the fresh sterile water to completely traverse the length of the coil and thereby maximize the heat exchange therebetween;

c. The centrifugal flow imparted to the superheated water as it is injected into the flash chamber through the tangential nozzle results in a rapid and even distribution of the water and an optimum flashing action;

d. The air exhaust flow from the aerator section is directed through the flash chamber to purge therefrom released gases and effect a continuous flushing action; and e. The vertical orientation of the apparatus requires a minimum of floor space and permits easy disassembly for cleaning by the simple removal of a few flange bolts.

BRIEF DESCRIPTION OF THE DRAWING

These and other objects and advantages will be apparent from the following description of a preferred embodiment of the invention, taken in conjunction with the drawings, in which:

FIG. 1 illustrates a side cutaway view of the complete apparatus of the invention; and FIG. 2 is a sectional view taken along lines 2—2 in FIG. 1.

DESCRIPTION OF THE PREFERRED EMBODIMENT:

The preferred embodiment will be described with reference to a water treatment usage, but it is to be understood that this is by way of example only, and the principles of this invention have equal applicability to other contaminated liquids as well.

Referring now to the drawings, tap water at approximately 70° F. enters helical condenser coil 10 vertically disposed within cylindrical flash chamber 12 through inlet conduit 14. The connection between the inlet conduit and the bottom of the condenser coil has been broken away for simplicity. The inlet conduit 14 is fitted through a top head plate 16 bolted to flange 18 on flash chamber 12. The tap water rises up through the coil 10, picking up heat as it goes, and leaves the chamber through outlet conduit 20 fitted through head plate 16. The temperature of the water as it leaves the condenser coil is between 130° and 150° F.

The preheated water then flows through line 22 to a steam heater 24 of the type disclosed in the aforementioned U.S. Pat. No. 3,488,925. The steam heater 24 includes a steam chamber defined by outer shell 26 and having a steam inlet 28 and a steam outlet 30. The steam supply connected to inlet 28 is derived from an external source, not shown. The shell 26 is closed at one end by a tube sheet 32 which carries a plurality of reverse bent heat exchange tubes 34 extending into the interior of the steam chamber. External of the tube sheet 32 are liquid inlet and outlet chambers 36 and 38, respectively, defined by a convex end cap 40 and a horizontally extending partition wall 42. The incoming preheated water enters inlet chamber 36, flows through heat exchange tubes 34, as shown by the arrows, into outlet chamber 38, and then proceeds through line 46 to an adjustable back pressure valve 44 of the type disclosed in the aforementioned patent.

The steam heater is sized and the back pressure valve is adjusted to provide superheated water at the outlet of the steam heater at a temperature of from 225° to 235° F. For a given size steam heater, the spring pressure exerted on the valve seat within back pressure valve 44 is the most determinative parameter in controlling the temperature of the superheated water in line 46. The superheating not only assures the complete destruction of all bacterial contaminants present in the water but also promotes the subsequent flashing action.

The superheated water passed by valve 44 is injected into the upper region of flash chamber 12 through a tangentially mounted conduit 48. This arrangement is shown more clearly in FIG. 2, and results in a strong centrifugal flow and even distribution of the incoming water around the flash chamber which greatly increases the efficiency of the flashing action of the water. As the water enters this flashing phase, stale air and other gaseous contaminants and impurities entrapped in the original tap water are quickly released and discharged to the atmosphere through vent pipe 50 extending through top head plate 16. The extension of the vent pipe down into the interior of the flash chamber 12 guards against external spattering of the flashing water and confines the flashing action to the interior of the chamber.

As soon as the flash steam and hot water come in contact with the relatively cool surfaces of the condenser coil 10, they begin to give up heat to the latter, and after a short time reenter the liquid phase by condensing and cooling back into pure water. The sterile water passes down the length of the condenser coil, effecting a further and continuing heat exchange therewith, and enters the open lower end of U-shaped overflow pipe 52. When the water rises to the level of the bend in the overflow pipe it is gravity fed through openings 54 into aeration chamber 56 mounted directly beneath the flash chamber 12 and connected thereto by flange bolts 58 which also clamp pipe support sheet 60 in place between the chambers.

A cylindrical baffle 62 separates the overflow pipe 52 from the condenser coil 10. This baffle assures that all of the freshly treated water must flow down the entire length of the coil before entering the overflow pipe, thereby providing a maximum heat exchange between the tap water and the treated water.

The overflow pipe 52 is provided with an anti-siphoning conduit 64 connected between its upper bend and air vent pipe 66. This effectively references the overflow pipe to atmospheric pressure and prevents any siphoning action which might otherwise lower the water level of the treated water in flash chamber 12.

As the treated water enters the aeration chamber 56 it is dispersed over and drips down through a bed of polished gravel 68, schematically represented in the drawing by circular balls. The gravel bed is supported on a grate 70 positioned above a perforated drip pan 72. The drip pan defines the top of an air chamber 74 whose bottom is defined by bottom head plate 76 secured to aeration chamber 56 by flange bolts 78. The bottom head plate 76 carries a water outlet pipe 80, and filtered air from a motor driven centrifugal blower 82 is directed into air chamber 74 through an air inlet pipe 84 mounted through the side of the aeration chamber.

As clean air from blower 82 is forced up through gravel bed 68 it cools and aerates the downwardly flowing treated water to restore a fresh, potable taste to it. The pasteurized, degasified and aerated water finally flows through grate 70 and pan 72, and collects in the bottom of air chamber 74, from which it is drawn off through outlet pipe 80 through an externally sealed conduit to a storage vessel, not shown, for subsequent use.

The air forced up through the gravel bed 68 leaves aeration chamber 56 through air vent pipe 66 which carries it up through flash chamber 12 and out vent pipe 50. As this air flows through the flash chamber it provides a flushing action which helps to purge the chamber of the gaseous contaminants dispelled by the flashing water.

All of the structural components of the apparatus are advantageously fabricated from high grade stainless steel. This eliminates any possibility of corrosion and maintains the apparatus in as clean and sterile a condition as possible. The apparatus may be easily disassembled for repair and occasional cleaning by the simple removal of the flange bolts securing the top and bottom head plates and the pipe support sheet in place.

While the invention has been particularly shown and described with reference to a preferred embodiment thereof, it will be understood by those skilled in the art that various changes in form and details may be made therein without departing from the spirit and scope of the invention.

What is claimed is:

1. A liquid purification and aeration system comprising:
   a. a flash chamber;
   b. a condenser coil disposed within the flash chamber for receiving incoming liquid and preheating same;
   c. means for superheating the liquid to destroy bacterial contaminants;
   d. means connecting an outlet of the coil to an inlet of the superheating means;
   e. means including a back pressure relief valve connecting an outlet of the superheating means to the flash chamber, whereby the superheated liquid entering the chamber flashes into the vapor phase releasing entrapped gaseous contaminants;
   f. a vent pipe mounted in the flash chamber for venting released gases;
   g. liquid overflow means disposed within the flash chamber for discharging fresh treated water above a predetermined level;
   h. a baffle within the flash chamber for separating the coil from the overflow means to insure maximum heat exchange between the treated water and the incoming liquid;
   i. an aeration chamber disposed below the flash chamber for receiving the discharged treated water from the overflow means;
   j. means for dispersing the treated water within the aeration chamber;
   k. means for forcing air up through the dispersing means to aerate the treated water;
   l. means at the bottom of the aeration chamber for collecting the aerated water; and
   m. means for venting the forced air through the flash chamber to purge released gases therefrom.

2. A system as recited in claim 1 wherein the flash chamber and the aeration chamber are cylindrical, the condenser coil is helical, and the means connecting an outlet of the superheating means to the flash chamber comprises a liquid conduit tangentially secured to the flash chamber.

3. A system as recited in claim 1 wherein the liquid overflow means is positioned within the condenser coil, the means for venting the forced air is positioned within the condenser coil and connected to the liquid overflow means by an anti-siphoning tube, and the baffle surrounds the liquid overflow means and the forced air venting means and extends above the liquid overflow means.

4. A system as recited in claim 2 wherein the liquid overflow means is positioned within the condenser coil, the means for venting the forced air is positioned within the condenser coil and connected to the liquid overflow means by an anti-siphoning tube, and the baffle surrounds the liquid overflow means and the forced air venting means and extends above the liquid overflow means.

5. A system as recited in claim 1 wherein the aeration chamber comprises liquid permeable support means adjacent the bottom of the chamber and the dispersing means comprises a particulate bed disposed above the support means.

6. A system as recited in claim 2 wherein the aeration chamber comprises liquid permeable support means adjacent the bottom of the chamber and the dispersing means comprises a particulate bed disposed above the support means.

7. A system as recited in claim 3 wherein the aeration chamber comprises liquid permeable support means adjacent the bottom of the chamber and the dispersing means comprises a particulate bed disposed above the support means.

8. A system as recited in claim 4 wherein the aeration chamber comprises liquid permeable support means adjacent the bottom of the chamber and the dispersing means comprises a particulate bed disposed above the support means.

* * * * *